United States Patent [19]

Föttinger et al.

[11] 4,300,968

[45] Nov. 17, 1981

[54] METHOD FOR BONDING FIBROUS WEB MATERIALS

[75] Inventors: Walter Föttinger; Bohuslav Tecl; Erich Fahrbach, all of Weinheim, Fed. Rep. of Germany

[73] Assignee: Firma Carl Freudenberg, Weinheim, Fed. Rep. of Germany

[21] Appl. No.: 104,770

[22] Filed: Dec. 18, 1979

[30] Foreign Application Priority Data

Dec. 21, 1978 [EP] European Pat. Off. ........ 78101813.0

[51] Int. Cl.³ ..................... B32B 33/00; D04H 3/12
[52] U.S. Cl. ..................... 156/181; 8/DIG. 12; 19/296; 28/122; 156/272; 156/277; 204/159.15; 427/54.1; 428/288; 428/290
[58] Field of Search ..................... 8/115–116, 8/DIG. 12; 19/296; 28/122; 156/62.2, 181, 272, 277; 204/159.15; 427/54.1; 428/290, 288

[56] References Cited

U.S. PATENT DOCUMENTS

| | | | |
|---|---|---|---|
| 4,146,417 | 3/1979 | Drelich et al. | 156/272 X |
| 4,212,901 | 7/1980 | van Neerbos et al. | 427/54.1 X |
| 4,222,835 | 9/1980 | Dixon | 204/159.16 |

FOREIGN PATENT DOCUMENTS 2618245 11/1977 Fed. Rep. of Germany.

*Primary Examiner*—Robert A. Dawson
*Attorney, Agent, or Firm*—Kenyon & Kenyon

[57] ABSTRACT

A method for bonding an unbonded fibrous web of natural and/or synthetic fibers by means of a binder which is cured by exposure to UV light, wherein the fibrous web is first compressed, smoothed, and heated, then one or both surfaces of the web is printed with a pattern of a prepolymer binder having a viscosity of from about 500 to 5000 centipoise and the prepolymer binder is cured by exposing the printed fibrous web to ultraviolet light.

19 Claims, No Drawings

METHOD FOR BONDING FIBROUS WEB MATERIALS

FIELD OF THE INVENTION

The invention described herein relates to a method for bonding a fibrous web material by printing a pattern of a binder onto one or both sides of the web.

BACKGROUND OF THE INVENTION

Fibrous webs consist of more or less irregularly bunched fibers of natural and/or synthetic materials which, apart from their mutual intertwining, have no internal cohesion whatsoever. The strength resulting from the intertwining of the fibers, particularly in low-weight classes, is so poor that the web has practically no inherent stability. Consequently, the web loses its cohesion as soon as it is without external support. The invention relates to a method for bonding such fibrous webs.

DE-OS No. 26 18 245 discloses a process for bonding a fibrous web material. In accordance with the method of this reference, a curable binder is printed in a pattern onto the surface of a fibrous web. The binder is cross-linked by exposing the web to electron irradiation. There are, however, several difficulties associated with the disclosed method which renders it unsuitable for large-scale production. Such difficulties are the result of the high viscosity of available prepolymers which have to be applied onto fibrous webs having poor mechanical stability.

In their cross-linked state, the strength of the available prepolymer binders increases with increasing molecular weight. To obtain a good consolidation of the fibrous web, it is, therefore, desirable to use prepolymer binders having a high molecular weight. However, the viscosity of the prepolymer binder also increases with the increasing molecular weight of the prepolymer. Viscous, high molecular weight prepolymers are difficult to apply to a fibrous web in a uniform distribution in the relatively small amounts employed. This is particularly true when the fibrous web has received no prebonding, and when the prepolymer is to be applied to only certain areas of the web, such as by a printing operation.

In the reference cited above, this difficulty is avoided by employing a prepolymer binder whose viscosity has been reduced by the addition of a solvent. Moreover, in Example 9 of the reference, prior to the addition of the prepolymer binders, the fibrous web is prebonded by the thermal activation of low-melting bonding fibers. Both procedures have disadvantageous aspects.

The use of solvents necessarily involves the high expense of equipment required to keep the air at the work station, and around the production line, free of solvent vapors. There is also the added expense associated with the recovery of excess solvent. Moreover, solvents are flammable and necessarily demand the implementation of elaborate means for the prevention of fires and explosions.

With regard to the thermal prebonding procedure disclosed by the cited reference, the thermal prebonding is irreversible upon the final solidification of the web. Such a procedure results, therefore, in the undesirable reduction or destruction of the bulk of the fibrous web material.

In addition to the technical difficulties discussed above, a large-scale application of the method disclosed by the cited reference is unfeasible since the prepolymer binder after being printed onto the fibrous web, must be cross-linked under a nitrogen atmosphere. Feeds of only 6 m/min are disclosed which are far below the operating speeds currently employed.

As an alternative to solvents it is known to add monomeric low viscosity esters of acrylic acid to the prepolymer binder in order to reduce its viscosity. The viscosity lowering esters are incorporated into the polymer network during the irradiation step. Acrylic acid esters useful for this purpose include butyl acrylate, hydroxyethyl acrylate, hydroxypropyl acrylate, butanediol diacrylate, hexanediol diacrylate, trimethylolpropane triacrylate, and others. Generally, the viscosity-lowering effect of these thinners is the greater, the lower their molecular weight. However, volatility and toxicity also increase as the molecular weight of the ester decreases. Polymers from monomeric acrylic acid esters are usually brittle, fragile products of inadequate mechanical strength. When the acrylic acid ester monomers are polymerized with prepolymer binders, they impair the mechanical properties of the prepolymer binders as well as the flexibility, toughness and softness of the fibrous web material.

Another problem associated with the use of acrylic acid esters results from the fact that residual monomer not reacted during the polymerization of the prepolymer/monomer mixture remains in the polymerization product and can cause skin irritations as well as disagreeable odors.

Due to the kinetics of the polymerization reaction of the monofunctional monomers, unconverted monomer will always be found in the polymerization product. In commercial monomer/prepolymer mixtures, 1% by weight or more of these monomers remains in the polymerization product. With regard to difunctional monomers, the danger of unreacted residual monomer is considerably reduced, but it is still present. Only acrylate monomers which are trifunctional, tetrafunctional, or higher, are incorporated completely into the polymer network. Thus, if possible, the use of monofunctional and difunctional reactive thinners should be avoided. However, mixtures of prepolymers with oligomers or monomers which are trifunctional or higher are always highly viscous, and it has thus far been impossible to process them.

BRIEF DESCRIPTION OF THE INVENTION

It is an object of this invention to provide a method for bonding a fibrous web material by printing a viscous prepolymer binder onto the fibrous web which does not require prebonding of the web prior to the printing step.

In accordance with the foregoing objective this invention provides a method for bonding a fibrous web which is both simple to operate, and capable of operating speeds greater than 50 m/min. This method comprises the steps of compressing, smoothing and heating the fibrous web; applying a UV curable prepolymer binder to the fibrous web; and curing the prepolymer binder by exposing the treated fibrous web to ultraviolet radiation.

The fibrous web may be compressed, smoothed and heated by passing it through heated rollers, and the prepolymer may be printed onto the fibrous web. The prepolymer is cured by exposing the web to ultraviolet light.

DETAILED DESCRIPTION OF THE INVENTION

In accordance with the method of this invention, a fibrous web from Rando-Webbers, rollercards, flatcards", or from a spun-bonded fabric machine is passed through the heated rollers of a calender. Immediately following this step, the web is fed through a printing machine which prints a pattern of a prepolymer onto the surface of the fibrous web. The prepolymer has a viscosity from about 500 to 5000 centipoise, and preferable a viscosity of from about 1000 to 4000 centipoise.

The heated roller step serves to smooth and compress the web, without bonding the fibers to each other. In addition, the individual fibers of the web are heated as they pass through the heated rollers. The temperature of the rollers should not exceed about 20° C. below the melting or decomposition point of the material comprising the web fibers. When the fibrous web is fed through the heated rollers at a speed of from about 30 to about 150 m/min, the rollers of the calender are desirably at a temperature of from about 120° to about 190° C., and preferably from about 130° to about 180° C.

Although the heated roller conditions employed do not cause the web fibers to bond to each other, the fibrous web is given a smooth external appearance. Thus, the web can be readily printed upon with a highly viscous prepolymer binder. Surprisingly, there are no differences whatsoever between the printability of fibrous webs formed from synthetic fibers and webs formed from natural fibers.

Not even a temporary bond, as could occur as a result of the removal of moisture from the various web fibers, is produced during the calendering step of this invention. The inherent stability of the fibrous web is relatively low when it leaves the calender, and it cannot be handled in a normal manner, such as by winding or unwinding.

Although it is clear that the fibrous web can be readily printed upon even with a highly viscous prepolymer binder, it is not fully understood why this is the case. One explanation may be that as a result of passage through the heated rollers, the fibers retain heat, which operates to reduce the viscosity of the prepolymer at the moment of contact with the web, and insures that the fibers are well wetted with the prepolymer binder. At the same time, a mutual bonding of the fibrous web in the area of the intersecting points occurs. The fibrous web leaves the printing machine completely undistorted. Surprisingly, adhesion of individual fibers of the fleece surface to the printing rollers does not occur. Thus, the practical application of the method of this invention proves to be entirely without problems. Moreover, it is subject to no restrictions whatever regarding the variation of the printing pattern used.

Preferably, the printing unit will immediately follow the heated rollers. If possible, their center distance between heated rollers and printer should not exceed 100 cm. In addition, it has been found that the structure of the surface of the calender rollers may affect the mechanical properties of the processed web material. Drapability in particular, is affected by the surface structure of the heated rollers.

Basically, the surface of the heated rollers may be of any desired type. Highly polished rollers as well as heavily profiled rollers may be employed. However, particularly good drapability and bulk of the processed fibrous web material are obtained when the surfaces are roughened slightly, or are provided with a very fine surface engraving. Usually, the two rollers are of completely identical design and are adjusted to the same temperature. However, adjusting the temperature of the rollers so that they differ, may be entirely practical in some cases.

The design or pattern in which the prepolymer binder is printed onto the fibrous web should enable production of as voluminous a fibrous web as possible, which also has good mechanical strength and good abrasion resistance and, in veiw of its preferred use as a garment interlining is also able to stand up well to dry cleaning. A pattern of two groups of parallel lines intersecting at about a 90° angle, and each being inclined at about a 45° angle relative to the direction of travel has proven particularly advantageous. The spacing of both groups of lines is preferably identical, and lies in a range of from about 1 to about 5 mm, preferably in a range of from about 1.5 to about 3.5 mm. The lines are from about 0.1 to about 0.5 mm wide, and preferably about 0.3 mm wide.

The pattern may be printed on one or both sides of the fibrous web. In the latter case, the nodal points of the pattern on one side of the fibrous web may be located at the empty spaces of the pattern printed onto the opposite side of the web. Different patterns may also be printed onto the opposide sides of the web.

The quantity of prepolymer which is applied will depend on the particular application intended. From about 5 to about 30 percent, and preferably from about 10 to about 25 percent of the prepolymer by weight of the fiber mass, is employed for the preparation of drycleanable and washable interlining materials.

When the fibrous web is uniformly heated during its passage through the heated rollers, the binder can be uniformly distributed over the cross-section of the web. A progressive distribution of the prepolymer binder occurs when the surface of the fibrous web opposite to the surface to which the prepolymer binder is applied, is heated to a lower temperature than the surface to which the prepolymer binder is applied. This can be accomplished by adjusting the heated rollers to different temperatures.

It is an advantage of the present invention that, as opposed to processes which print with solutions or aqueous dispersions of the prepolymer binder, no binder migration takes place during curing. Rather, upon irradiation with ultraviolet light, the binder is solidified directly in its original position. Therefore, the procedure can be controlled easily in such a way so that no web delamination occurs.

Various UV-curable prepolymer binders may be employed in accordance with this method. However, an appropriately high viscosity is an important property of the prepolymer binder. For the preferred end use of the fibrous web product as interlining material for use in garment manufacture, another important criteria for the selection of the prepolymer is its resistance to drycleaning agents such as perchloroethylene. This resistance is produced by a relatively high cross-linking density. Therefore, resins with more than two acrylate functions per molecule are preferred. Useful, commercially available resins include acrylated polyesters, polyurethanes, polyepoxides and polyvinyl compounds. The polymer may be mixed with a multifunctional acrylate oligomer or with a multifunctional monomer such as pentaerythritol triacrylate, pentaerythritol tetraacrylate, or trimethylolpropane triacrylate to adjust the viscosity of the prepolymer binder. Particularly high viscous binders, or binder mixtures, may be applied in a heated state in order to reduce their viscosity. It is also possible to use mixtures of two, or more, different prepolymers.

For activation, UV curable binders require the addition of an initiator. Useful initiators include benzoinbutyl ether, benzoinethyl ether, benzildimethylketal, diethoxy acetophenone, or benzophenone.

It is a particular advantage of the present method that relatively little of the expensive initiator is required. The rate of curing during the UV irradiaton step increases with the initial viscosity of the prepolymer employed. Therefore, since the processing of highly viscous resins or resin mixtures is made possible by the present method, relatively little initiator is required.

In addition to the initiator, substances which intensify the initiator's effect or further reduce the amount of initiator required may be employed. Such substances include amines such as triethanol amine. In addition, if required, optical brigtheners may also be added to the prepolymer mixture. The addition of optical brighteners is often advantageous for textile applications. Brighteners which dissolve well in the binders, and are sufficiently UV-resistant to withstand the intensive UV exposure, are preferred. Although optical brighteners are UV absorbers by nature and, therefore, would be expected to have a retarding effect on the hardening reaction, surprisingly, they can be added to the binder without a reduction in the rate of hardening. Moreover, it is possible to add solid or liquid plasticizers such as dibutylphthalate or toluolsulfonamide. The softening effect produced by these compounds relates to the mechanical properties of the cured binder.

If desired, pigments may be added to the binder, but it should be noted that pigments absorb UV radiation to a greater or lesser degree and can, therefore, hinder the curing process.

Finally, it is also possible to add abrasives such as quartz powder, corundum, etc. to the resin mixture. Through such additions, particularly flexible, materials for grinding, or abrasion purposes are obtained.

Any commercially available high pressure mercury lamp which attains a minimum output of 80 Watt/cm is suitable for use during the UV irradiation step. In most cases, both sides of the treated fibrous web are exposed to the ultraviolet light. However, when very light fibrous webs of about 25 g/m² or less are employed, it is possible to subject only one side of the fibrous web to UV irradiation.

The electric power to be installed for the UV irradiation apparatus will depend on the travel speed desired, and on the reactivity of the particular UV-curable prepolymer binder. The processing of highly viscous and highly reactive binders has the advantage that the extent of the electric power required is minimal, and the number of UV lamps required can be kept low—even at travel speeds of from about 100 to about 150 m/min. Moreover, it is generally unnecessary to perform the UV treatment under a protective atmosphere, such as a nitrogen atmosphere, in order to increase process speed.

The bonded fibrous web material produced in accordance with the method of this invention is unusually soft, voluminous and full. Significantly, despite its good strength, the fibrous web product does not have the so-called "springy feel" which heretofore has been characteristic of all fibrous web materials bonded by chemical binders. Thus, the bonded fibrous web of this invention is particularly well suited for use as an interlining material in modern leisure clothing, whose soft and flowing characteristics should not be impaired by a spring-elastic interlining material.

The production of fibrous web materials which are soft, drapable and full and, at the same time, resistant to chemical cleansers has posed a definite problem to the art. The fibrous web materials prepared by the method of this invention, however, are soft and full, and stand up well to washing and dry cleaning. These properties are attributed to the unusual binder distribution within the fibrous web. At the moment of printing, the highly viscous, UV-curable prepolymer binder does not distribute evenly over the entire surface of the fibers, but rather it migrates in minute droplets, preferably to the fiber intersections. The bonding points are particularly strong because the binder adheres directly to the fiber surface without the presence of a separate layer of tensides or other substances, as may occur during the application of a conventional binder in an aqueous dispersion. As a result of the relatively small amounts of binder applied not all intersections are bonded. The novel fiber bond produced by the method of this invention results in a bonded fibrous web material which is unusually soft and cloth-like. The present method can be applied extremely economically and inexpensively. It meets all the prerequisites for large scale application.

The invention will be described further with reference to the following examples.

EXAMPLE 1

A lengthwise oriented fiber fleece weighing 20 g/m², and consisting of polyester fibers of 1.3 dtex Denier with a length of 36 mm, is fed through a pair of metal rollers at a speed of 100 m/min. The two rollers are of identical design. Their diameter is 200 mm, and their surface has an 80 mesh engraving which means that the individual depressions have a mutual spacing of about 0.3 mm, and a depth of about 0.1 mm. The rollers are heated to 175° C. The spacing between the rollers is adjusted so that the two rollers barely touch, but do not exert any appreciable pressure on each other. Before entering the roller gap, the fiber nap has a thickness of about 10 mm, which is reduced to a thickness of about 1 mm, during the passage through the roller pair.

After compression and tempering, the mechanical strength of the fiber fleece is 1.5 N in longitudinal direction and 0.08 N in transverse direction.

At a center distance of 800 mm from the heated rollers the fibrous web is printed on one side by a printing unit, with a pattern of two groups of parallel lines which intersect at a 90° angle, and which are each inclined at a 45° angle relative to the travel direction. The mutual spacing of the lines is 2.5 mm and their width is 0.3 mm.

The binder mixture employed has a viscosity of 3300 centipoise at 24° C.

The composition of the mixture is as follows:

|  | Parts by Weight |
| --- | --- |
| Polyurethane prepolymer (Ebecryl 830, Union Chimique Belge) | 50.00 |
| Polyurethane oligomer (OTA 480, Union Chimique Belge) | 50.00 |
| Optical brightener (Hostalux KCB, Hoechst AG) | 0.03 |
| Benzildimethylketal (Luzirin BDK, BASF AG) | 1.00 |
| Benzophenone | 2.00 |

| | Parts by Weight |
|---|---|
| Methyldiethanol amine | 3.00 |

The amount applied is 2.5 g/m². Immediately after printing is complete, the web is strengthened by exposure to a high-pressure mercury lamp. Its output is 200 Watt/cm.

The fibrous web material obtained is 0.23 mm thick. It is soft and drapable. It is printed with a conventional polyamide fusing adhesive in dot form, the quantity applied being 12 g/m². It is subsequently ironed to a ladies blouse material. The laminate is washable and dry-cleanable. No knotting or pilling occurs.

EXAMPLE 2

A crosswise oriented fibrous web weighing 30 g/m² and consisting of highly crinkled Nylon-66 fibers of 3.3 Denier with a length of 51 mm is fed at a rate of 50 m/min through a pair of smooth steel rollers heated to 200° C. The gap width between the rollers is 0.01 mm. Immediately thereafter the nap is printed in a rotary film printing machine with the resin mixture described in Example 1. Rollers of the printing machine are electrolytically roughened. The printing pattern is analogous to Example 1, except that the grid spacing is 3.5 mm.

The subsequent cross-linking takes place by the exposure of both sides of the web to a 200 Watt/cm high-pressure mercury lamp.

The fibrous web material obtained is extremely soft and voluminous. It stands up well to washing and dry cleaning.

EXAMPLE 3

A lengthwise oriented fiber nap weighing 35 g/m² and consisting of shiny polyacrylonitrile fibers of 3.3 Denier, with a length of 60 mm, is fed at a rate of 80 m/min through two rollers heated to 195° C.

Immediately after calendering, both sides of the nap are printed upon the manner described in Example 1, with a total of 8 g/m² of the resin mixture of Example 1. The spacing of each printed grid is 2.1 mm. The resin is cured by exposing both sides of the printed web to a high-pressure mercury lamp of 200 Watt/cm power output.

The bonded fibrous web product has a tear strength in the longitudinal direction of 50 N/5 cm strip width. The strengthened fibrous web is particularly well suited for use in what is referred to as "overlay" in fiberglass-reinforced plastics.

The invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

I claim:

1. A method for bonding a fibrous web comprising the steps of:
   (a) compressing and smoothing a fibrous web by passing said web through heated rollers, said rollers being at a temperature at least about 20° C. below the melting point of the fibers comprising said web, and wherein said fibrous web is heated by said rollers but the fibers comprising said web are not bonded together; and
   (b) applying a UV hardenable solvent-free prepolymer binder composition to said fibrous web, said prepolymer having a viscosity of from about 500 to about 5000 centipoise during application; and
   (c) curing said prepolymer binder by exposing said treated fibrous web to ultraviolet radiation.

2. The method according to claim 1 wherein said prepolymer is printed onto said fibrous web.

3. The method according to claim 2 wherein the weight of said prepolymer binder printed onto the fibrous web is from about 5 to about 30% of the weight of said fibrous web.

4. The method according to claim 3 wherein
   (a) the spacing between said rollers is adapted such that said rollers contact each other with minimal pressure.

5. The method according to claim 4 wherein
   (a) the temperature of said rollers is from about 120° C. to about 190° C., and
   (b) said fibrous web is fed through said rollers at a rate of from about 50 to about 150 m/min.

6. The method according to claim 3 wherein said prepolymer binder composition comprises a solution of said prepolymer and a thinner for said prepolymer.

7. The method according to claim 6 wherein said thinner is selected from the group consisting of tri- or tetrafunctional acrylate monomers or multifunctional acrylate oligomers.

8. The method according to claim 7 wherein said thinner is a multifunctional acrylate monomer selected from the group consisting of pentaerythrite triacrylate, pentaerythrite tetraacrylate, or trimethylolpropane triacrylate; and said prepolymer is selected from the group consisting of the low molecular weight polyurethane, polyester or polyepoxy prepolymers.

9. The method according to claim 3 wherein said prepolymer composition is heated.

10. The method according to claim 2 wherein said prepolymer binder is cured by exposing said fibrous web to a high-pressure mercury lamp having a radiation output of at least about 80 Watts per cm of fibrous web width.

11. The method according to claim 2 wherein the surface of said rollers is roughened.

12. The method according to claim 2 wherein said fibrous web is comprised of nylon fibers or polyacrylonitrile fibers.

13. The method according to claim 3 wherein the weight of said prepolymer is from about 10 to about 25 percent of the weight of said fibrous web, and said prepolymer binder composition has a viscosity of from about 1000 to about 4000 centipoise.

14. The method according to claim 3 wherein the viscosity of said prepolymer binder composition is adjusted by the addition of an oligomer to said prepolymer.

15. The method according to claim 3 wherein said prepolymer binder composition comprises a mixture of polyurethane prepolymer with polyurethane oligomer.

16. In a method for bonding a fibrous web by printing a prepolymer binder onto one or both surfaces of the fibrous web, and subsequently cross-linking said prepolymer binder, the improvement which comprises:
(a) compressing, smoothing and heating said fibrous web immediately prior to printing a solvent-free prepolymer binder onto said web, wherein said fibrous web is passed through rollers heated to a temperature at least about 20° C. below the melting point of the fibers comprising said web, such that said web is compressed, smoothed and heated but the fibers of said web are not bonded together and wherein said prepolymer binder has a viscosity of from about 500 to 5000 centipoise, and is printed onto said fibrous web in an amount comprising from about 5 to about 30% of the weight of said fibrous web; and
(b) subsequent to printing said prepolymer binder onto said fibrous web, immediately exposing said fibrous web to ultraviolet light to cure said prepolymer binder.

17. The method according to claim 16 wherein
(a) said fibrous web is smoothed, compressed and heated by passing it through heated rollers; and
(b) the spacing between said rollers is adapted such that said rollers contact each other with minimal pressure; and
(c) the temperature of said rollers is adjusted to within the range of from about 120° to about 190° C., and at least about 20° C. below the melting point of the fibers of said web; and
(d) said fibrous web is fed through said rollers at the rate of from about 50 to about 150 m/min.

18. The method according to claims 16 or 17 wherein
(a) the viscosity of said prepolymer is adjusted by heating said prepolymer and/or by the addition to said prepolymer of an acrylate oligomer or a multifunctional acrylate monomer; said acrylate monomer being selected from the group consisting of pentaerythritol triacrylate, pentaerythritol tetraacrylate and trimethylolpropane triacrylate, and
(b) said prepolymer is selected from the group consisting of the low molecular weight polyurethane, polyester and polyepoxy prepolymers.

19. The method according to claim 18 wherein said fibrous web having said prepolymer printed thereon is exposed to a high-pressure mercury lamp having an output of at least about 80 Watts per cm of width of said fibrous web.

* * * * *

UNITED STATES PATENT AND TRADEMARK OFFICE
CERTIFICATE OF CORRECTION

PATENT NO. : 4,300,968

DATED : November 7, 1981

INVENTOR(S) : Walter Fottinger et al.

It is certified that error appears in the above—identified patent and that said Letters Patent is hereby corrected as shown below:

Column 2, line 66, after "prepolymer" insert -- binder --.

Column 4, line 12, after "interlining" insert -- , --.

Column 7, line 42, after "upon" insert -- in --.

Signed and Sealed this

Eleventh Day of May 1982

[SEAL]

Attest:

GERALD J. MOSSINGHOFF

Attesting Officer     Commissioner of Patents and Trademarks